(12) United States Patent
Zich et al.

(10) Patent No.: US 7,559,540 B2
(45) Date of Patent: Jul. 14, 2009

(54) STACKED PACKING FOR HEAT EXCHANGE AND MASS TRANSFER

(75) Inventors: Egon Zich, Leichlingen (DE); Helmut Jansen, Dormagen (DE); Thomas Rietfort, Bottrop (DE); Björn Kaibel, Hilden (DE)

(73) Assignee: Julius Montz GmbH, Hilden (DE)

( * ) Notice: Subject to any disclaimer, the term of this patent is extended or adjusted under 35 U.S.C. 154(b) by 496 days.

(21) Appl. No.: 10/572,541

(22) PCT Filed: Jul. 24, 2004

(86) PCT No.: PCT/EP2004/008329

§ 371 (c)(1),
(2), (4) Date: Mar. 17, 2006

(87) PCT Pub. No.: WO2005/037429

PCT Pub. Date: Apr. 28, 2005

(65) Prior Publication Data

US 2007/0035047 A1   Feb. 15, 2007

(30) Foreign Application Priority Data

Sep. 20, 2003   (DE) .............................. 103 43 649

(51) Int. Cl.
   *B01F 3/04*   (2006.01)

(52) U.S. Cl. .................. 261/97; 261/110; 261/DIG. 72

(58) Field of Classification Search .................. 261/94, 261/95, 97, 110, 112.1, 112.2, DIG. 72
See application file for complete search history.

(56) References Cited

U.S. PATENT DOCUMENTS

| | | | | |
|---|---|---|---|---|
| 3,738,626 | A * | 6/1973 | Norback | 261/112.2 |
| 4,708,832 | A * | 11/1987 | Norback | 261/153 |
| 4,842,778 | A * | 6/1989 | Chen et al. | 261/97 |
| 5,518,667 | A * | 5/1996 | Lehman | 261/97 |
| 5,725,810 | A * | 3/1998 | Brunner et al. | 261/112.2 |
| 5,876,638 | A * | 3/1999 | Sunder et al. | 261/112.2 |
| 5,984,282 | A * | 11/1999 | Armstrong et al. | 261/112.2 |
| 5,997,173 | A * | 12/1999 | Ingram et al. | 366/337 |
| 6,397,630 | B1 * | 6/2002 | Fraysse et al. | 62/643 |
| 6,425,574 | B1 * | 7/2002 | Sunder | 261/94 |
| 6,427,985 | B1 * | 8/2002 | Kaibel et al. | 261/112.2 |
| 6,991,222 | B2 * | 1/2006 | Meski et al. | 261/94 |
| 2003/0090009 | A1 * | 5/2003 | Zich et al. | 261/97 |

* cited by examiner

*Primary Examiner*—Scott Bushey
(74) *Attorney, Agent, or Firm*—Andrew Wilford

(57) ABSTRACT

A stacked packing for a heat-exchange or mass-transfer column has a horizontal packing part formed of a plurality of upright layers. Some of the layers of the lower part are of substantially greater density and have a greater surface area than others of the layers.

8 Claims, 1 Drawing Sheet

STACKED PACKING FOR HEAT EXCHANGE AND MASS TRANSFER

CROSS REFERENCE TO RELATED APPLICATIONS

This application is the US national phase of PCT application PCT/EP2004/008329, filed 24 Jul. 2004, published 28 Apr. 2005 as WO2005/037429, and claiming the priority of German patent application 10343649.9 itself filed 20 Sep. 2003, whose entire disclosures are herewith incorporated by reference.

FIELD OF THE INVENTION

The invention relates to a stacked packing for a heat-exchange and/or mass-transfer column with at least one packing comprised of several layered parts.

BACKGROUND OF THE INVENTION

For distillative separation stacked packings are used in addition to walls and filler bodies. These packings are made in many different shapes. Packings of a cross-channel structure are particularly widespread.

Packings for a distillation column are normally formed of parts of identical geometry, for example zigzag-shaped bent sheet metal, expanded metal, or wire meshes. The purpose of this uniform geometric shape is to ensure that the flow of gas and liquid is uniform over the entire flow cross section of the column. Deviations, special surface effects of the fluid or streaming of the fluid must be avoided as these have a negative effect on the separation capacity. In order to avoid such negative irregularities on must provide every several meters liquid collectors and redistributors. In addition to the cost of this equipment, its height of from 1.5 to 2.5 m is disadvantageous, as it increases the overall column height.

OBJECT OF THE INVENTION

It is an object of the invention to provide a packing of the named type that produces uniform liquid distribution over the flow cross-section of the column.

SUMMARY OF THE INVENTION

This object is achieved according to the invention in that some of the layers of the packing part are of greater density and therefore have a greater surface area than other layers.

It has been discovered that the above-described negative characteristics of stacked packings can be reduced or completely eliminated with respect to uniformity of liquid distribution when such a packing is used. In contrast to a conventional column packing the layers of these packings are not all of identical geometry, but are specifically made to be different.

BRIEF DESCRIPTION OF THE DRAWING

Two embodiments of the invention are shown in the drawing and described more closely in the following, therein.

SPECIFIC DESCRIPTION

A column holds several packing assembles extending horizontally one above the other. The assemblies each have one or more packings 3 that are each formed of packing layers 4a and 4b that extend perpendicular or at an acute angle.

Figure 1:
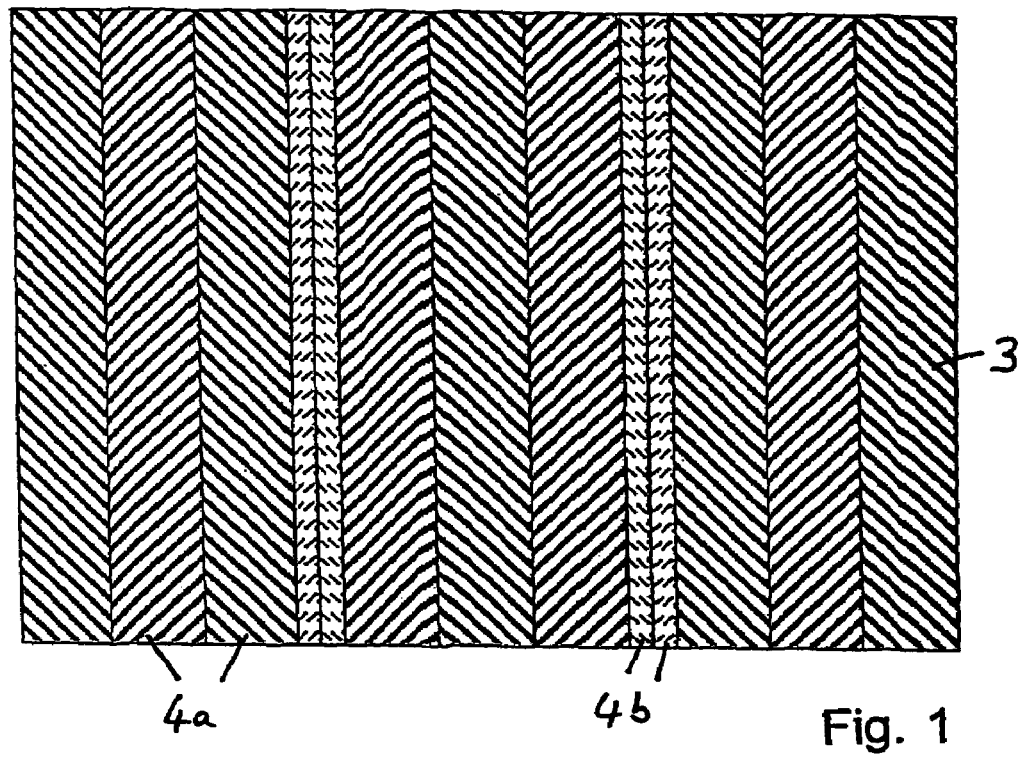
FIG. 1 is a first embodiment of a packing or packing assembly in section.
Figure 2:
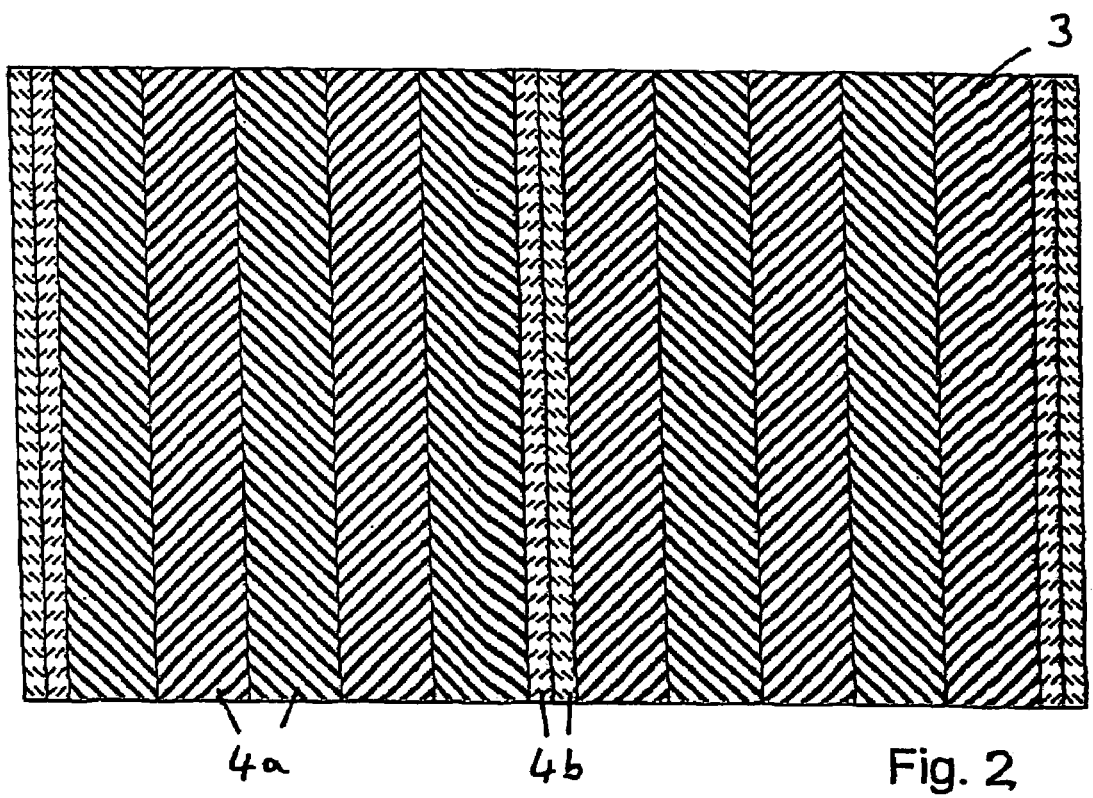
FIG. 2 is a second embodiment of a packing or packing assembly in section.

FIGS. 1 and 2 are sections of the packings 3 according to the invention where the packing layers have at least two different gross specific surface areas. As a rule the two thinner denser packing layers 4b with the greater specific surface area are directly against each other. Between these layers 4b with the larger specific surface area there are 1 to about 10, preferably 3 to 6, adjacent layers 4a of smaller specific surface area.

The specific surface area of the layers 4a with the smaller specific surface area corresponds in the art with standard geometry to a specific surface area of about 150 to 750 $m^2/m^3$.

The layers 4b with the greater specific area have a specific surface area that is bigger by a factor of 2 to 10. The basis for this very large specific surface area lies in the insert deflecting function used in standard distillation systems.

While the standard packings effect a counter flow of gas and liquid, with the liquid forming a liquid film on the packing surface and being traversed in countercurrent by the gas phase, the interstices of the packing layer 4b with the larger specific surface area are preferably only or primarily traversed by liquid. In these liquid-filled interstices there is good distribution of a portion of the liquid flow and uniform distribution. Such packing installations are therefore effective as flow spreaders. They render partially or wholly unnecessary the provision of liquid collectors and distributors.

In order also to get some mass transfer in the thin liquid-filled packing layers 4b between the gas and liquid phases, these layers are preferably made of materials that have perforations, for example expanded metal or wire meshes.

Astonishingly, experiments have shown that in the layers 4b the liquid goes very freely into the narrow flow passages and is distributed uniformly along the passages.

It is sufficient when only a portion of about 5 to 20% of the liquid is passed through the narrow passages of the thin packing layers 4b. The remaining liquid is distribute din the remaining packing layers 4b with the smaller specific surface area.

The invention claimed is:

1. A stacked packing for a heat-exchange or mass-transfer column, the packing comprising
   a horizontal packing part formed of a plurality of upright layers, some of the layers of the horizontal packing part being of substantially greater density and having a greater surface area than others of the layers.

2. The packing according to claim 1 wherein the packing layer of larger surface area has a surface area that is 2 to 10 times greater that the surface area of the other layers.

3. The packing according to claim 1 wherein the packing layers of higher surface area are arrayed in pairs in which they are mounted directly against each other.

4. The packing according to claim 3 wherein, between the pairs of layers of greater surface area there are 1 to 10 of the layers with a smaller surface area.

5. A stacked packing according to claim 1, wherein the packing layers with the larger surface area are made of materials that have perforations.

6. The stacked packing defined in claim 1 wherein the layers are transverse to the horizontal.

7. The stacked packing defined in claim 6 wherein the layers are perpendicular to the horizontal.

8. The stacked packing defined in claim 6 wherein the layers extend vertically through the part.

* * * * *